(12) United States Patent
Chen et al.

(10) Patent No.: US 12,169,302 B1
(45) Date of Patent: Dec. 17, 2024

(54) BENDING-RESISTANT LOW-CROSSTALK PHOTONIC ORBITAL ANGULAR MOMENTUM FIBER WAVEGUIDE

(71) Applicant: SHANGHAI UNIVERSITY, Shanghai (CN)

(72) Inventors: Wei Chen, Shanghai (CN); Fufei Pang, Shanghai (CN); Tinyun Wang, Shanghai (CN); Sujuan Huang, Shanghai (CN); Xiaobei Zhang, Shanghai (CN); Jianxiang Wen, Shanghai (CN); Yanhua Dong, Shanghai (CN); Yi Huang, Shanghai (CN); Ying Zhang, Shanghai (CN); Yang Wang, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 0 days.

(21) Appl. No.: 18/709,269

(22) PCT Filed: Jan. 4, 2023

(86) PCT No.: PCT/CN2023/070373
§ 371 (c)(1),
(2) Date: May 10, 2024

(87) PCT Pub. No.: WO2023/138370
PCT Pub. Date: Jul. 27, 2023

(30) Foreign Application Priority Data

Jan. 20, 2022 (CN) .......................... 202210067754.3

(51) Int. Cl.
*G02B 6/036* (2006.01)
*G02B 6/02* (2006.01)
*G02B 6/028* (2006.01)

(52) U.S. Cl.
CPC ...... *G02B 6/03611* (2013.01); *G02B 6/02042* (2013.01); *G02B 6/0285* (2013.01)

(58) Field of Classification Search
CPC .............. G02B 6/02042; G02B 6/0285; G02B 6/03611
See application file for complete search history.

(56) References Cited

U.S. PATENT DOCUMENTS

| 2015/0104139 | A1 | 4/2015 | Brunet et al. | |
| 2024/0192437 | A1* | 6/2024 | Sato | ........................ G02B 6/028 |

FOREIGN PATENT DOCUMENTS

| CN | 104698534 A | 6/2015 |
| CN | 106772786 A | 5/2017 |
| CN | 114415286 A | 4/2022 |

OTHER PUBLICATIONS

International Search Report of PCT/CN2023/070373.
(Continued)

*Primary Examiner* — Andrew Jordan

(57) ABSTRACT

A bending-resistant low-crosstalk photonic orbital angular momentum (OAM) optical fiber waveguide. An optical fiber sequentially comprises, from the center to the outside, a first core layer (1), a second core layer (2), a first cladding layer (3), a second cladding layer (4), and a third cladding layer (5), wherein the third cladding layer (5) is the thickest, the first core layer (1) is the second thickest, and the first cladding layer (3) is the thinnest; the refractive index of the first cladding layer (3) is the lowest, the refractive index of the second cladding layer (4) is the second lowest, and the refractive index of the second core layer (2) is the highest. The waveguide structure can effectively regulate the output of different OAM modes, and an effective refractive index difference between modes is greater than $2\times10^{-4}$, the modes are easy to separate, and multiplexing and demultiplexing are facilitated.

5 Claims, 2 Drawing Sheets

(56) References Cited

OTHER PUBLICATIONS

Written Opinion of PCT/CN2023/070373.
Liu, Shuaishuai et al. "OAM Modes Amplifier based on Erbium-doped Ring-core Fiber" 2021 IEEE 6th Optoelectronics Global Conference, Dec. 27, 2021.

* cited by examiner

BENDING-RESISTANT LOW-CROSSTALK PHOTONIC ORBITAL ANGULAR MOMENTUM FIBER WAVEGUIDE

CROSS-REFERENCE TO RELATED APPLICATIONS

This Application is a national stage application of PCT/CN2023/070373. This application claims priorities from PCT Application No. PCT/CN2023/070373, filed Jan. 4, 2023, and from the Chinese patent application 202210067754.3 filed Jan. 20, 2022, the content of which are incorporated herein in the entirety by reference.

TECHNICAL FIELD

The present disclosure relates to a novel optical waveguide for space division multiplexing in the field of optical fiber communication, particularly to an anti-bending, low crosstalk optical fiber with orbital angular momentum (OAM).

BACKGROUND

For understanding, the professional terms involved in the present disclosure are as follows:
OAM: Orbital Angular Momentum, which refers to the rotation of electrons around the propagation axis, resulting in a vortex-like phase front due to the rotation of energy flow (described by Poynting vector) around the optical axis.
SAM: Spin Angular Momentum, which is only related to the spin of photons and manifests as circular polarization.
RIP: Refractive Index Profile, which is the relationship curve between the refractive index of the optical fiber or preform (including core rods) and its radius.
Radial Core Gradient Refractive Index Profile Function:

$$n(r) = n_2 \left[ 1 - 2\Delta \left( \frac{r - r_a}{d/2} \right)^g \right]^{1/2}, \text{ where, } r_1 \leq r \leq r_2,$$

$$r_a = (r_1 + r_2)/2, d = r_2 - r_1, \Delta = \frac{n_2^2 - n_1^2}{2n_2^2},$$

n is the refractive index, n1 is generally the refractive index in the core, n2 is generally the refractive index in the cladding or edge, r1 and r2 are the radii of different refractive index layers, g is the refractive index profile distribution parameter.
WDM: Wavelength Division Multiplexing
QAM: Quadrature Amplitude Modulation
QPSK: Quadrature Phase Shift Keying
MIMO: Multiple-Input Multiple-Out-put
SDM: Space Division Multiplexing
Shannon limit: The Shannon limit or Shannon capacity of a communication channel is the theoretical maximum information transmission rate for a specific level of noise. The famous Shannon theorem is given by the formula: C=B×log2(1+S/N), where C is the achievable link speed (channel capacity), B is the bandwidth of the link, S is the average signal power, N is the average noise power, and the signal-to-noise ratio (S/N) is usually expressed in decibels (dB), where dB=10×1 g(S/N).
Quantum Tunneling Effect (QTE): The quantum tunneling effect is a quantum property where microscopic particles like electrons can tunnel into or through a potential barrier, even though the height of the barrier is greater than the total energy of the particle. According to quantum mechanics, microscopic particles have wave properties, and there is a non-zero probability of them tunneling through the barrier.

Looking at the trend in optical fiber communication capacity, based on widely used techniques like wavelength division multiplexing (WDM) and various advanced modulation techniques (QAM, QPSK, etc.), existing optical fiber communication systems have approached and will soon reach the Shannon Limit (Shannon capacity) of standard single-mode fiber (SMF) transmission capacity. The low-frequency bands used in 5G (5th generation mobile communication) do not have fundamental differences from the 4G (4th generation mobile communication) we currently use. The main improvement in channel capacity is achieved through techniques like Multiple Input Multiple Output (MIMO) and Non-Orthogonal Multiple Access (NOMA). In the 6G phase, since 5G technology has approached the "Shannon limit," the approach will be to increase the channel bandwidth, with the core of the channel bandwidth being the "medium for information transmission-optical fiber material." With the explosive growth of data transmission in 5G, 6G faces many new transmission challenges, and breaking through the transmission capacity bottleneck is imminent.

In recent years, research progress aimed at improving optical fiber communication capacity has shown that using higher-order vector modes of optical fibers-orbital angular momentum (OAM)—as a new dimension for spatial division multiplexing (SDM) has become a hot research and application direction in the field of optical fiber communication. OAM optical fibers carrying orbital angular momentum information can effectively expand the scale of optical communication multiplexing from a scientific theoretical perspective. The topological charge of orbital angular momentum can be infinitely expanded, effectively expanding the scale of optical communication multiplexing. Photons not only have longitudinal linear momentum along the direction of propagation but also have angular momentum related to the polarization properties of light, known as spin angular momentum (SAM). Unlike SAM, OAM beams have a phase structure related to the angular distribution, thus carrying orbital angular momentum. OAM corresponds to infinitely many eigenvalues of photons, theoretically constructing a Hilbert infinite-dimensional space with infinitely many eigenmodes, where each mode is orthogonal to each other. Orbital angular momentum brings a completely new degree of freedom to photons. When using photons for classical or quantum information processing, preparing photon spin and orbital angular momentum entanglement can realize high-dimensional quantum information systems. In optical communication, it can be used to carry information, improve the data capacity of communication systems, and have excellent advantages in high-data-capacity communication systems, achieving high-capacity, high-speed, and large-scale optical communication network deployment.

In the current field of optical fiber communication, since single-mode fiber transmission is widely used in existing networks, and the transmission modes supported by traditional single-mode fibers must be the fundamental mode, OAM waves with spiral phase fronts will degenerate into plane waves when transmitted in single-mode fibers due to the simplicity of the mode. Therefore, special fiber designs are needed for OAM channel transmission. In 2013, the team led by Alan E. Willner at Boston University in the United States used specially designed fibers to transmit OAM beams [Nenad Bozinovic, Siddharth Ramachandran. Terabit-scale orbital angular momentum mode division multiplexing in fibers [J]. Science, 2013, 340 (6140): 1545-1548], achieving a transmission capacity of 1.6 Tbit/s over a transmission fiber length of 1.1 km. This research provides possibilities for future optical fiber transmission based on OAM-based optical communication technology. In recent years, research on spatial division multiplexing communication using photon orbital angular momentum dimensions has become a hot spot in the field of high-capacity communication.

However, in practice, OAM beams not only cause new problems such as increased beam size and mode crosstalk during transmission but also pose challenges to aperture adaptation at the receiver and accurate classification of detected OAM values. On the other hand, the methods of generating OAM beams also face challenges. OAM beams are mainly generated in two ways: generating OAM mode beams in space and generating them in optical fibers. There are three methods for generating OAM mode beams in space: the first method directly outputs OAM beams using lasers, which is an in-cavity generation method. OAM beams are generated by modulating laser beams inside laser cavities. However, the generation cost of this type of OAM beam is high, and the stability of OAM modes is easily affected, with low purity. The second method uses spatial structuring devices, but this approach involves many devices and complex structures, and it also faces problems of stability and purity of OAM modes. The third method is to generate and transmit in optical fibers, which simplifies the optical structure and achieves higher phase purity. OAM beams in optical fibers are obtained by superposing corresponding-order vector modes in the fiber, resulting in higher phase purity. Therefore, scientists worldwide are conducting research on waveguide structures that can generate excellent OAM modes.

The US patent US20190170933A1 proposes a spiral optical fiber for multi-mode illumination, which can generate two-order OAM modes, mainly used for generating circular beams for illumination. It is not suitable for applications in the communication field due to its short transmission distance.

The world patent WO2017210679A1 proposes a system and method for manufacturing spiral optical fibers, but this method does not explicitly specify the structural parameters of the spiral optical fiber and the characteristics of OAM modes.

The US patent U.S. Pat. No. 8,948,559B2 proposes a space division multiplexing multi-linearly polarized mode optical fiber, with a core refractive index distribution of a gradually parabolic shape, achieving 2 to 4 fewer modes by reducing the relative refractive index difference of the core to 0.8%, and reducing Raleigh scattering loss. This patent does not specify the characteristics and performance parameters of its OAM mode.

The US patent U.S. Pat. No. 8,705,922B2 proposes a four-mode optical fiber, with a high refractive index core, a core refractive index profile distributed in a parabolic shape, and a parabolic profile parameter g value ranging from 1.9 to 2.1. At a wavelength of 1550 nm, the DGD delay is 150 ps/km. This patent does not specify the characteristics and performance parameters of its OAM mode.

The Chinese patent CN110297288A proposes a low-attenuation step-type orbital angular momentum optical fiber, which has a complex waveguide structure, requires good control of the refractive index distribution, has strict manufacturing methods, and is difficult to implement. In addition, mode crosstalk needs further improvement.

The Chinese patent CN110333572A proposes a low-attenuation gradient-type orbital angular momentum optical fiber, which is similar to CN110297288A in its basic waveguide structure. It involves a refractive index gradient in the circular part, which is difficult to implement, and mode crosstalk needs further improvement.

The Chinese patent CN108680990A proposes a circular core orbital angular momentum optical fiber, but its attenuation is greater than 1 dB/km, suitable for short-distance transmission; Chinese patent CN106338793A proposes a circular core optical fiber that can suppress some easily coupled higher-order modes, but its attenuation reaches 0.31 dB/km, which still has some distance from low-loss attenuation requirements.

The Chinese patent CN105242347A proposes a high-purity, low-intrinsic-crosstalk orbital angular momentum transmission optical fiber. The core refractive index profile of the fiber adopts a parabolic distribution, and the g value of the refractive index distribution is greater than 2.1. Moreover, the relative refractive index difference between the core and the cladding reaches 0.10. It is difficult to achieve in the communication fiber quartz system, and mode crosstalk is difficult to control, and attenuation is difficult to reduce to meet the requirements of long-distance transmission.

SUMMARY

The technical problem to be solved by the present disclosure is as follows: Considering the above, traditional optical fibers and reported disclosure patents cannot effectively meet the demand for the development of photon orbital angular momentum (OAM) channel transmission in the field of high-capacity spatial division multiplexing optical fiber communication systems. To address the significant practical need for the next generation of optical fiber communication systems using spatial division multiplexing technology, the present disclosure proposes a type of anti-bending low crosstalk photon orbital angular momentum fiber waveguides. This fiber waveguide can control four different-order photon orbital angular momentum (OAM) modes within the wavelength range of 1530 nm to 1565 nm. It exhibits strong resistance to bending, easy mode separation, and low crosstalk between modes. The waveguide structure is suitable for large-scale production and can be applied to stable transmission in long-distance optical fiber communication systems.

The Technical Solution of the Present Disclosure is as Follows:

A bending-resistant low-crosstalk photonic orbital angular momentum fiber waveguide, the fiber sequentially consists of a first core layer, a second core layer, a first cladding layer, a second cladding layer, and a third cladding layer from the center outward, with the third cladding layer being the thickest, followed by the first core layer, and the first cladding layer being the thinnest; the refractive index of the first cladding layer is the smallest, followed by the second cladding layer, and the refractive index of the second core layer is the largest.

The relationship between the radius $r_1$ of the first core layer and the radius $r_2$ of the second core layer is described by the function $A=k_1\times10\times\log(r_2/r_1)/(L-2)$, where $k_1$ ranges from 0.36 to 1.52, L ranges from 3 to 9, and A ranges from 0.06446 to 1.61151.

The relationship between the radius $r_3$ of the first cladding layer and the radius $r_2$ of the second core layer is described by the function $B=k_2\times10\times\log(r_3/r_2)\times(L-2)$, where $k_2$ ranges from 0.66 to 1.37, L ranges from 2 to 9, and B ranges from 0 to 3.4649.

The refractive index difference between the first core layer refractive index $n_1$ and the third cladding layer refractive index $n_5$ ranges from $-0.00029$ to $-0.01603$.

The refractive index difference between the second core layer refractive index $n_2$ and the third cladding layer refractive index $n_5$ ranges from 0.017485 to 0.037885. The refractive index difference between the first cladding layer refractive index $n_3$ and the third cladding layer refractive index $n_5$ ranges from $-0.005$ to $-0.0153$.

The refractive index difference between the second cladding layer refractive index $n_4$ and the third cladding layer refractive index $n_5$ ranges from $-0.005$ to $-0.0153$.

The refractive index curve of the second core layer $n_2$ varies and satisfies the refractive index profile distribution function:

$$n(r) = n_2\left[1 - 2\Delta\left(\frac{r-r_1}{\frac{d}{2}}\right)^g\right]^{\frac{1}{2}}, \text{ where } r_1 \leq r \leq r_2,$$

$$r_a = (r_1 + r_2)/2, \, d = r_2 - r_1, \, \Delta = \frac{n_2^2 - n_5^2}{2n_2^2},$$

and g is the refractive index profile distribution parameter, which ranges from $-2$ to 9.

The value of g can be $-2$, $-3$, 2, 3, or 5.

This fiber can control four different orders of OAM modes output within the wavelength range of 1530 nm to 1565 nm, achieving stable transmission, including OAM-0, OAM-±1, OAM-±2, and OAM-±3 modes. The effective refractive index difference between each OAM mode is greater than $1.52\times10^{-4}$.

The bending loss of each OAM mode of the fiber at the wavelength of 1550 nm is small, with a macrobending loss of less than or equal to 0.50 dB for a 1-loop R5 mm bend. The crosstalk between OAM-0 mode and OAM-±1 mode is less than $-9$ dB/80 km, between OAM-±1 mode and OAM-±2 mode is less than $-16$ dB/80 km, between OAM-±1 mode and OAM-±2 mode is less than $-15$ dB/80 km, and between OAM-±1 mode and OAM-±3 mode is less than $-25$ dB/80 km.

The beneficial effects of this disclosure are as follows:
(1) The waveguide structure of this disclosure can effectively control the output of different modes of OAM orbital angular momentum. The effective refractive index difference between modes is greater than $2\times10^{-4}$, making mode separation easy, facilitating reuse and demultiplexing.
(2) This disclosure's waveguide exhibits excellent bending resistance. The bending loss of each OAM mode at a wavelength of 1550 nm is minimal, with a macrobending loss of less than or equal to 0.50 dB for a 1-loop R5 mm bend. This low bending loss, coupled with minimal additional losses due to bending, enables adaptation to complex bending environments, thereby enhancing application reliability.
(3) The high purity of OAM orbital angular momentum in this disclosure's waveguide results in minimal crosstalk between modes. This makes it suitable for long-distance transmission in fiber optic communication SDM spatial multiplexing systems, meeting the requirements of 400G high-speed transmission systems. Consequently, it offers promising applications and economic and social benefits.
(4) The stable waveguide structure of this disclosure is easy to implement and can improve production efficiency, making it suitable for large-scale production.

BRIEF DESCRIPTION OF THE DRAWINGS

To provide a clearer understanding of the technical solution of the embodiments of the present disclosure, a brief introduction to the drawings required in the embodiments will be presented below. The following drawings only illustrate certain embodiments of the present disclosure and should not be construed as limiting the scope. Ordinary skilled artisans in the field can obtain other relevant drawings based on these drawings without exercising creative labor.

After reading the detailed description of the embodiments disclosed herein in conjunction with the following drawings, a better understanding of the features and advantages of the present disclosure can be achieved. In the drawings, the components may not be drawn to scale, and components with similar relevant characteristics or features may have the same or similar reference numerals.

Wherein: 1—First core layer, 2—Second core layer, 3—First cladding layer, 4—Second cladding layer, 5—Third cladding layer, 6—Inner coating, 7—Outer coating.

DETAILED DESCRIPTION OF THE DISCLOSURE

The following provides a detailed description of the present disclosure with reference to the drawings and specific embodiments. Aspects described in conjunction with the drawings and specific embodiments are exemplary and should not be construed as limiting the scope of the present disclosure.

Figure 1:
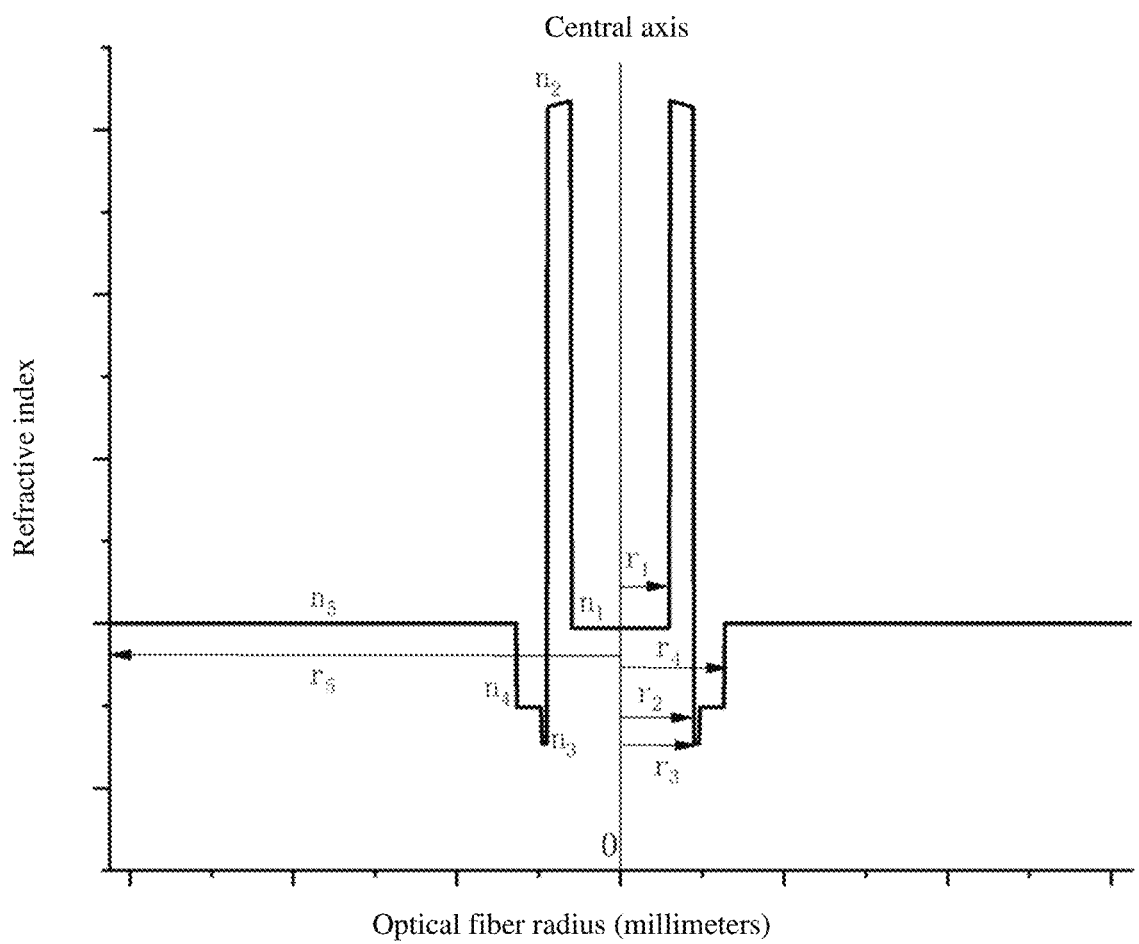
FIG. 1 is a schematic diagram of the refractive index profile structure of the fiber waveguide of the present disclosure.
Figure 2:
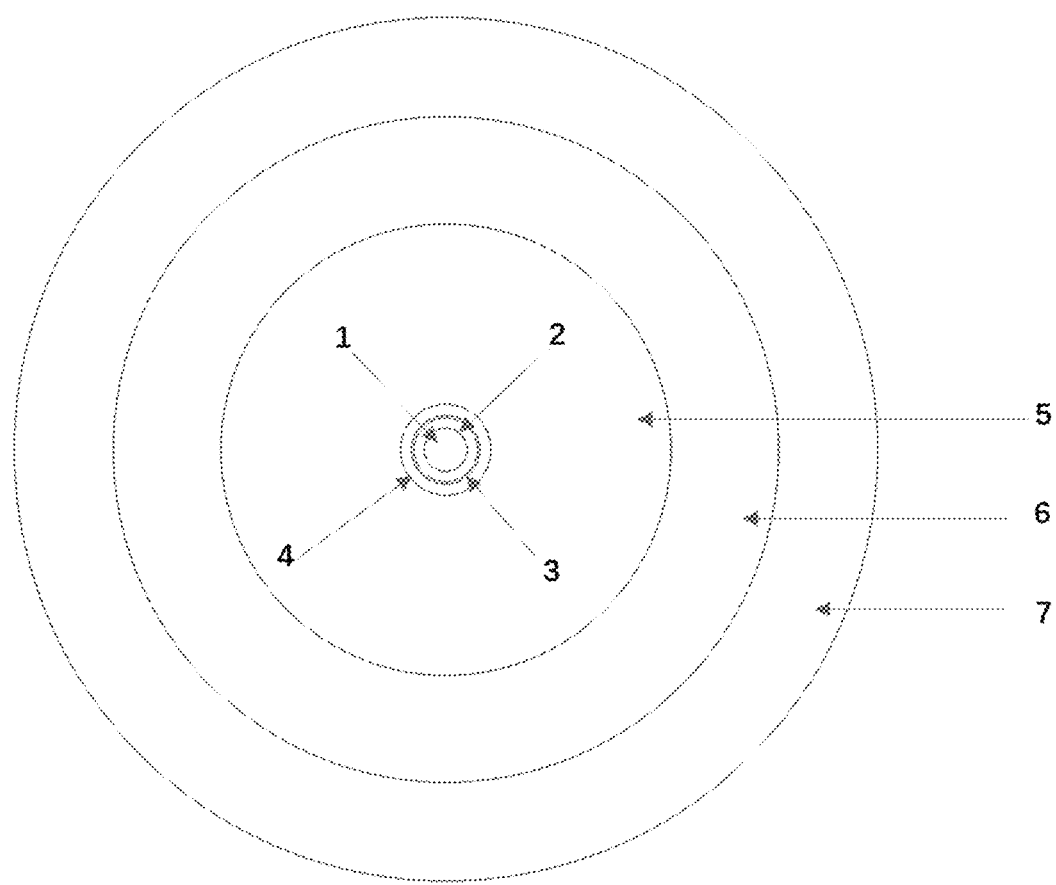
FIG. 2 is a schematic diagram of the end face structure of the fiber waveguide of the present disclosure.

As shown in FIGS. 1 and 2, the present disclosure provides a fiber waveguide for photon orbital angular momentum (OAM) transmission. The fiber waveguide is composed of two core layers, three cladding layers, and coating layers. Specifically, from the center outward, it consists of the first core layer ($r_1$), the second core layer ($r_2$), the first cladding layer ($r_3$), the second cladding layer ($r_4$), and the third cladding layer ($r_5$), as well as coating layers outside the third cladding layer, composed of an inner coating (6) and an outer coating (7) as shown in FIG. 2. The third cladding layer is the thickest, followed by the first core layer, and the first cladding layer is the thinnest. The refractive index of the first cladding layer is the smallest, followed by the second cladding layer.

The relationship between the radii $r_1$ and $r_2$ of the first and second core layers satisfies the function $A=k_1\times10\times\log(r_2/r_1)/(L-2)$, where $k_1$ ranges from 0.36 to 1.52, L ranges from 3 to 9, and A ranges from 0.06446 to 1.61151. The relationship between the radius $r_3$ of the first cladding layer and the radius $r_2$ of the second core layer satisfies the function $B=k_2\times10\times\log(r_3/r_2)\times(L-2)$, where $k_2$ ranges from 0.66 to 1.37, L ranges from 2 to 9, and B ranges from 0 to 3.4649. The refractive index difference between the first core layer $n_1$ and the third cladding layer $n_5$ ranges from −0.00029 to −0.01603. The refractive index difference between the second core layer $n_2$ and the third cladding layer $n_5$ is 0.017485. The refractive index difference between the first cladding layer $n_3$ and the third cladding layer $n_5$ ranges from −0.005 to −0.0153. The second cladding layer refractive index difference $n_4$ and the third cladding layer refractive index $n_5$ range from −0.005 to −0.0153. The refractive index of the second core layer $n_2$ has a radial gradient, following the refractive index profile distribution function formula $$n(r) = n_2 \left[1 - 2\Delta\left(\frac{r-r_1}{\frac{d}{2}}\right)^g\right]^{\frac{1}{2}}, \text{ where } r_1 \le r \le r_2,$$

$$r_a = (r_1 + r_2)/2, \, d = r_2 - r_1, \, \Delta = \frac{n_2^2 - n_5^2}{2n_2^2},$$

and g is the refractive index profile distribution parameter. The refractive index profile distribution parameter g of the second core layer refractive index $n_2$ ranges from −2 to 9, preferably g=−2, −3, 2, 3, or 5.

The fiber waveguide for photon orbital angular momentum transmission can control the output of four different-order OAM modes within the wavelength range of 1530 nm to 1565 nm to achieve stable transmission, including OAM-0, OAM-±1, OAM-±2, and OAM-±3 modes. The effective refractive index difference between each OAM mode is greater than 1.52×10-4. The bending loss of each OAM mode of the fiber waveguide at a wavelength of 1550 nm is small, with a macro-bending loss of less than or equal to 0.50 dB for one loop at an R5 mm bend. The crosstalk between OAM-0 and OAM-±1 modes is less than −9 dB/80 km, between OAM-±1 and OAM-±2 modes is less than −16 dB/80 km, between OAM-±1 and OAM-±2 modes is less than −15 dB/80 km, and between OAM-±1 and OAM-±3 modes is less than −25 dB/80 km.

Example 1

The present disclosure provides a fiber waveguide for photon orbital angular momentum (OAM) transmission, which consists of two core layers, three cladding layers, and coating layers. The characteristics are as follows: from the center outward, there are the first core layer ($r_1$), the second core layer ($r_2$), the first cladding layer ($r_3$), the second cladding layer ($r_4$), and the third cladding layer ($r_5$). The coating layer outside the third cladding layer is composed of an inner coating and an outer coating, which are cured by ultraviolet light-cured organic resin. The relationship between the radii $r_1$ and $r_2$ of the first and second core layers satisfies the function A=$k_1$×10×log($r_2$/$r_1$)/(L−2), where $k_1$=0.36, A=0.06446, and L ranges from 3 to 9. The relationship between the radius $r_3$ of the first cladding layer and the radius $r_2$ of the second core layer satisfies the function B=$k_2$×10×log($r_3$/$r_2$)×(L−2), where $k_2$=0.66, B=0.3131, and L ranges from 2 to 9. The refractive index difference between the first core layer $n_1$ and the third cladding layer $n_5$ is −0.00029. The refractive index difference between the second core layer $n_2$ and the third cladding layer $n_5$ is 0.017485. The refractive index difference between the first cladding layer $n_3$ and the third cladding layer $n_5$ is −0.005, and the structure of this cladding layer waveguide has quantum tunneling effects, which can control the mode loss characteristics. The refractive index difference between the second cladding layer $n_4$ and the third cladding layer $n_5$ is −0.00. The refractive index profile distribution function of the second core layer's annular core gradient is given by the formula $$n(r) = n_2 \left[1 - 2\Delta\left(\frac{r-r_1}{\frac{d}{2}}\right)^g\right]^{\frac{1}{2}}, \text{ where } r_1 \le r \le r_2,$$

$$r_a = (r_1 + r_2)/2, \, d = r_2 - r_1, \, \Delta = \frac{n_2^2 - n_5^2}{2n_2^2},$$

and g is the refractive index profile distribution parameter. The refractive index curve of the second core layer $n_2$ varies and satisfies the refractive index profile distribution function, with a value of g=−2. The fiber waveguide for photon orbital angular momentum transmission can control four different-order OAM modes within the wavelength range of 1530 nm to 1565 nm to achieve stable transmission, including OAM-0, OAM-±1, OAM-±2, and OAM-±3, where the effective refractive index difference between each OAM mode is greater than 1.53×10-4 (refer to Table 1). The bending loss of each OAM mode of the fiber waveguide at a wavelength of 1550 nm is small, with a macro-bending loss of less than or equal to 0.50 dB for one loop at an R5 mm bend (refer to Table 1). The crosstalk between OAM-0 and OAM-±1 modes is less than−9 dB/80 km, between OAM-±1 and OAM-±2 modes is less than−16 dB/80 km, between OAM-±1 and OAM-±2 modes is less than−15 dB/80 km, and between OAM-±1 and OAM-±3 modes is less than−25 dB/80 km (refer to Table 1).

Example 2

The present disclosure provides a fiber waveguide for photon orbital angular momentum (OAM) transmission, which consists of two core layers, three cladding layers, and coating layers. The characteristics are as follows: from the center outward, there are the first core layer ($r_1$), the second core layer ($r_2$), the first cladding layer ($r_3$), the second cladding layer ($r_4$), and the third cladding layer ($r_5$), as well as coating layers outside the third cladding layer. The relationship between the radii $r_1$ and $r_2$ of the first and second core layers satisfies the function A=$k_1$×10×log($r_2$/$r_1$)/(L−2), where $k_1$=1.52, A=1.61151, and L ranges from 3 to 9. The relationship between the radius $r_3$ of the first cladding layer and the radius 12 of the second core layer satisfies the function B=$k_2$×10×log($r_3$/$r_2$)×(L−2), where $k_2$=1.37, B=3.4649, and L ranges from 2 to 9. The refractive index difference between the first core layer $n_1$ and the third cladding layer $n_5$ is −0.01603. The refractive index difference between the second core layer $n_2$ and the third cladding layer $n_5$ is 0.037885. The refractive index difference between the first cladding layer $n_3$ and the third cladding layer $n_5$ is −0.0153, and the structure of this cladding layer waveguide has quantum tunneling effects, which can control the mode loss characteristics. The refractive index difference between the second cladding layer $n_4$ and the third cladding layer $n_5$ is −0.0153. The refractive index profile distribution function of the second core layer's annular core gradient is given by the formula $$n(r) = n_2 \left[1 - 2\Delta\left(\frac{r-r_1}{\frac{d}{2}}\right)^g\right]^{\frac{1}{2}}, \text{ where } r_1 \le r \le r_2,$$

-continued $$r_a = (r_1 + r_2)/2, d = r_2 - r_1, \Delta = \frac{n_2^2 - n_5^2}{2n_2^2},$$

and g is the refractive index profile distribution parameter. The refractive index curve of the second core layer $n_2$ varies and satisfies the refractive index profile distribution function, with a value of g=−3. The fiber waveguide for photon orbital angular momentum transmission can control four different-order OAM modes within the wavelength range of 1530 nm to 1565 nm to achieve stable transmission, including OAM-0, OAM-±1, OAM-±2, and OAM-±3, where the effective refractive index difference between each OAM mode is greater than 1.52×10-4 (refer to Table 1). The bending loss of each OAM mode of the fiber waveguide at a wavelength of 1550 nm is small, with a macro-bending loss of less than or equal to 0.37 dB for one loop at an R5 mm bend (refer to Table 1). The crosstalk between OAM-0 and OAM-±1 modes is less than −9 dB/80 km, between OAM-±1 and OAM-±2 modes is less than −16 dB/80 km, between OAM-±1 and OAM-±2 modes is less than −15 dB/80 km, and between OAM-±1 and OAM-±3 modes is less than −25 dB/80 km (refer to Table 1).

Example 3

The present disclosure provides a fiber waveguide for photon orbital angular momentum (OAM) transmission, which consists of two core layers, three cladding layers, and coating layers. The characteristics are as follows: from the center outward, there are the first core layer ($r_1$), the second core layer ($r_2$), the first cladding layer ($r_3$), the second cladding layer ($r_4$), and the third cladding layer ($r_5$), as well as coating layers outside the third cladding layer. The relationship between the radii $r_1$ and $r_2$ of the first and second core layers satisfies the function A=$k_1$×10×log($r_2/r_1$)/(L−2), where $k_1$=1.01, A=0.8057, and L ranges from 3 to 9. The relationship between the radius $r_3$ of the first cladding layer and the radius $r_2$ of the second core layer satisfies the function B=$k_2$×10×log($r_3/r_2$)×(L−2), where $k_2$=1.12, B=0.6281, and L ranges from 3 to 9. The refractive index difference between the first core layer $n_1$ and the third cladding layer $n_5$ is −0.00949. The refractive index difference between the second core layer $n_2$ and the third cladding layer $n_5$ is 0.029146. The refractive index difference between the first cladding layer $n_3$ and the third cladding layer $n_5$ is −0.01093, and the structure of this cladding layer waveguide has quantum tunneling effects, which can control the mode loss characteristics. The refractive index difference between the second cladding layer $n_4$ and the third cladding layer $n_5$ is −0.00729. The refractive index profile distribution function of the second core layer's annular core gradient is given by the formula $$n(r) = n_2 \left[ 1 - 2\Delta \left( \frac{r - r_1}{\frac{d}{2}} \right)^g \right]^{\frac{1}{2}}, \text{ where } r_1 \leq r \leq r_2,$$

$$r_a = (r_1 + r_2)/2, d = r_2 - r_1, \Delta = \frac{n_2^2 - n_5^2}{2n_2^2},$$

and g is the refractive index profile distribution parameter. The refractive index curve of the second core layer $n_2$ varies and satisfies the refractive index profile distribution function, with a value of g=9. The fiber waveguide for photon orbital angular momentum transmission can control four different-order OAM modes within the wavelength range of 1530 nm to 1565 nm to achieve stable transmission, including OAM-0, OAM-±1, OAM-±2, and OAM-±3, where the effective refractive index difference between each OAM mode is greater than 1.52×10-4 (refer to Table 1). The bending loss of each OAM mode of the fiber waveguide at a wavelength of 1550 nm is small, with a macro-bending loss of less than or equal to 0.43 dB for one loop at an R5 mm bend (refer to Table 1). The crosstalk between OAM-0 and OAM-±1 modes is less than −9 dB/80 km, between OAM-±1 and OAM-±2 modes is less than −16 dB/80 km, between OAM-±1 and OAM-±2 modes is less than-15 dB/80 km, and between OAM-±1 and OAM-±3 modes is less than −25 dB/80 km (refer to Table 1).

Example 4

The present disclosure provides a photonic orbital angular momentum (OAM) optical fiber waveguide, which is composed of two core layers, three cladding layers, and a coating layer. The features include: from the center outward, the structure consists of the first core layer ($r_1$), the second core layer ($r_2$), the first cladding layer ($r_3$), the second cladding layer ($r_4$), the third cladding layer ($r_5$), and the coating layer outside the third cladding layer. The relationship function between the radius $r_1$ of the first core layer and the radius $r_2$ of the second core layer is given by A=$k_1$×10×log($r_2/r_1$)/(L−2), where $k_1$=0.96, A=0.5371, and L is an integer ranging from 3 to 9. The relationship between the radius $r_3$ of the first cladding layer and the radius 12 of the second core layer is described by the function B=$k_2$×10×log($r_3/r_2$)×(L−2), where $k_2$=0.987, B=0.9422, and L is an integer ranging from 2 to 9. The refractive index difference between the first core layer with refractive index $n_1$ and the third cladding layer with refractive index $n_5$ is −0.01392. The refractive index difference between the second core layer with refractive index $n_2$ and the third cladding layer with refractive index $n_5$ is 0.032056. The refractive index difference between the first cladding layer with refractive index $n_3$ and the third cladding layer with refractive index $n_5$ is −0.011953. The refractive index difference between the second cladding layer with refractive index $n_4$ and the third cladding layer with refractive index $n_5$ is −0.009651. The refractive index profile distribution function of the second core layer's annular core gradient is given by $$n(r) = n_2 \left[ 1 - 2\Delta \left( \frac{r - r_1}{\frac{d}{2}} \right)^g \right]^{\frac{1}{2}}, \text{ where } r_1 \leq r \leq r_2,$$

$$r_a = (r_1 + r_2)/2, d = r_2 - r_1, \Delta = \frac{n_2^2 - n_5^2}{2n_2^2},$$

and g is the refractive index profile distribution parameter. The refractive index curve of the second core layer $n_2$ varies and satisfies the refractive index profile distribution function, with a value of g=2. The photonic orbital angular momentum optical fiber waveguide can control the output of four different orders of OAM modes within the wavelength range of 1530 nm to 1565 nm, achieving stable transmission of OAM-0th, OAM-±1st, OAM-±2nd, and OAM-±3rd orders. The effective refractive index difference between each OAM mode is greater than 1.52×10-4. The bending loss of each OAM mode at a wavelength of 1550 nm is small, with macro bending loss of R5 mm less than or equal to 0.45 dB. The crosstalk between OAM-0th and OAM-±1st modes is less than −9 dB/80 km, between OAM-±1st and OAM-±2nd modes is less than −16 dB/80 km, between OAM-±1st and OAM-±2nd modes is less than −15 dB/80 km, and between OAM-±1st and OAM-±3rd modes is less than −25 dB/80 km.

Example 5

The present disclosure provides a photonic orbital angular momentum (OAM) optical fiber waveguide, which is composed of two core layers, three cladding layers, and a coating layer. The features include: from the center outward, the structure consists of the first core layer ($r_1$), the second core layer ($r_2$), the first cladding layer ($r_3$), the second cladding layer ($r_4$), the third cladding layer ($r_5$), and the coating layer outside the third cladding layer. The relationship function between the radius $r_1$ of the first core layer and the radius $r_2$ of the second core layer is given by $A=k_1\times10\times\log(r_2/r_1)/(L-2)$, where $k_1=1.12$, $A=0.3223$, and L is an integer ranging from 3 to 9. The relationship between the radius $r_3$ of the first cladding layer and the radius $r_2$ of the second core layer is described by the function $B=k_2\times10\times\log(r_3/r_2)\times(L-2)$, where $k_2=1.32$, $L=2$, and $B=0$. The refractive index difference between the first core layer with refractive index $n_1$ and the third cladding layer with refractive index $n_5$ is −0.01506. The refractive index difference between the second core layer with refractive index $n_2$ and the third cladding layer with refractive index $n_5$ is 0.027399. The refractive index difference between the first cladding layer with refractive index $n_3$ and the third cladding layer with refractive index $n_5$ is 0; The refractive index difference between the second cladding layer with refractive index $n_4$ and the third cladding layer with refractive index $n_5$ is −0.00939. The refractive index profile distribution function of the second core layer's annular core gradient is given by $$n(r) = n_2\left[1 - 2\Delta\left(\frac{r-r_1}{\frac{d}{2}}\right)^g\right]^{\frac{1}{2}}, \text{ where } r_1 \le r \le r_2,$$

$$r_a = (r_1 + r_2)/2, \ d = r_2 - r_1, \ \Delta = \frac{n_2^2 - n_5^2}{2n_2^2},$$

and g is the refractive index profile distribution parameter. The refractive index curve of the second core layer $n_2$ varies and satisfies the refractive index profile distribution function, with a value of g=5. The photonic orbital angular momentum optical fiber waveguide can control the output of four different orders of OAM modes within the wavelength range of 1530 nm to 1565 nm, achieving stable transmission of OAM-0th, OAM-±1st, OAM-±2nd, and OAM-±3rd orders. The effective refractive index difference between each OAM mode is greater than 1.52×10-4. The bending loss of each OAM mode at a wavelength of 1550 nm is small, with macro bending loss of R5 mm less than or equal to 0.45 dB. The crosstalk between OAM-0th and OAM-±1st modes is less than −9 dB/80 km, between OAM-±1st and OAM-±2nd modes is less than −16 dB/80 km, between OAM-±1st and OAM-±2nd modes is less than −15 dB/80 km, and between OAM-±1st and OAM-±3rd modes is less than −25 dB/80 km.

Example 6

The present disclosure provides a photonic orbital angular momentum (OAM) optical fiber waveguide, which is composed of two core layers, three cladding layers, and a coating layer. The features include: from the center outward, the structure consists of the first core layer ($r_1$), the second core layer ($r_2$), the first cladding layer ($r_3$), the second cladding layer ($r_4$), the third cladding layer ($r_5$), and the coating layer outside the third cladding layer. The relationship function between the radius $r_1$ of the first core layer and the radius $r_2$ of the second core layer is given by $A=k_1\times10\times\log(r_2/r_1)/(L-2)$, where $k_1=0.837$, $A=0.16115$, and L is an integer ranging from 3 to 9. The relationship between the radius $r_3$ of the first cladding layer and the radius 12 of the second core layer is described by the function $B=k_2\times10\times\log(r_3/r_2)\times(L-2)$, where $k_2=0.763$, $B=2.9185$, and L is an integer ranging from 2 to 9. The refractive index difference between the first core layer with refractive index $n_1$ and the third cladding layer with refractive index $n_5$ is −0.01039. The refractive index difference between the second core layer with refractive index $n_2$ and the third cladding layer with refractive index $n_5$ is 0.035065. The refractive index difference between the first cladding layer with refractive index $n_3$ and the third cladding layer with refractive index $n_5$ is −0.00796. The refractive index difference between the second cladding layer with refractive index $n_4$ and the third cladding layer with refractive index $n_5$ is −0.00856. The refractive index profile distribution function of the second core layer's annular core gradient is given by $$n(r) = n_2\left[1 - 2\Delta\left(\frac{r-r_1}{\frac{d}{2}}\right)^g\right]^{\frac{1}{2}}, \text{ where } r_1 \le r \le r_2,$$

$$r_a = (r_1 + r_2)/2, \ d = r_2 - r_1, \ \Delta = \frac{n_2^2 - n_5^2}{2n_2^2},$$

and g is the refractive index profile distribution parameter. The refractive index curve of the second core layer $n_2$ varies and satisfies the refractive index profile distribution function, with a value of g=3. The photonic orbital angular momentum optical fiber waveguide can control the output of four different orders of OAM modes within the wavelength range of 1530 nm to 1565 nm, achieving stable transmission of OAM-0th, OAM-±1st, OAM-±2nd, and OAM-±3rd orders. The effective refractive index difference between each OAM mode is greater than 1.52×10-4. The bending loss of each OAM mode at a wavelength of 1550 nm is small, with macro bending loss of R5 mm less than or equal to 0.46 dB. The crosstalk between OAM-0th and OAM-±1st modes is less than −9 dB/80 km, between OAM-±1st and OAM-±2nd modes is less than-16 dB/80 km, between OAM-±1st and OAM-±2nd modes is less than −15 dB/80 km, and between OAM-±1st and OAM-±3rd modes is less than −25 dB/80 km.

The main performance indicators of the fiber optic waveguides in the above implementation examples are listed in Table 1. Table 1: Main performance indicators of fiber optic waveguides in implementation examples.

| Item | Mode | Example 1 | Example 2 | Example 3 | Example 4 | Example 5 | Example 6 |
|---|---|---|---|---|---|---|---|
| Crosstalk (dB/80 km) | OAM0-OAM1 | −10.2 | −12.3 | −11.5 | −9.7 | −10.9 | −11.8 |
| | OAM1-OAM2 | −16.3 | −17.6 | −17.1 | −16.5 | −16.6 | −16.9 |
| | OAM2-OAM3 | −15.8 | −16.2 | −15.9 | −16.2 | −16.5 | −15.7 |
| | OAM1-OAM3 | −25.5 | −26.7 | −26.1 | −25.3 | −26.4 | −25.2 |
| Macro-Bending Loss (dB) @ 1550 (R5*1 loop) | OAM0 | 0.50 | 0.36 | 0.43 | 0.45 | 0.38 | 0.46 |
| | OAM ± 1 | 0.32 | 0.25 | 0.3 | 0.33 | 0.29 | 0.25 |
| | OAM ± 2 | 0.39 | 0.37 | 0.33 | 0.4 | 0.45 | 0.36 |
| | OAM ± 3 | 0.29 | 0.26 | 0.35 | 0.43 | 0.39 | 0.42 |

The various embodiments in this specification are described progressively, with each embodiment focusing on the differences from other embodiments. The similarities and identical parts among the embodiments can be referenced interchangeably.

The description provided herein is intended to enable any person skilled in the art to make or use the present disclosure. Modifications to the present disclosure will be apparent to those skilled in the art, and the universally applicable principles defined herein can be applied to other variations without departing from the spirit or scope of the present disclosure. Therefore, the present disclosure is not intended to be limited to the examples and designs described herein but should be granted the broadest scope consistent with the principles and novel features disclosed herein.

The above-described embodiments are merely exemplary of the present application and should not be construed as limiting the application. Any modifications, equivalent substitutions, improvements, etc., made within the spirit and principles of the present application should be included within the scope of protection of the present application.

The invention claimed is:

1. A bending-resistant low-crosstalk photonic orbital angular momentum fiber waveguides, wherein the fiber sequentially consists of a first core layer, a second core layer, a first cladding layer, a second cladding layer, and a third cladding layer from the center outward, with the third cladding layer being the thickest, followed by the first core layer, and the first cladding layer being the thinnest; the refractive index of the first cladding layer is the smallest, followed by the second cladding layer, and the refractive index of the second core layer is the largest; the relationship function relationship A between the radii $r_1$ of the first core layer and $r_2$ of the second core layer satisfies A=$k_1$×10×log $(r_2/r_1)/(L-2)$, where $k_1$ ranges from 0.36 to 1.52, L ranges from 3 to 9, and A ranges from 0.06446 to 1.61151; the relationship function B between the radius $r_3$ of the first cladding layer and the radius $r_2$ of the second core layer satisfies B=$k_2$×10×log $(r_3/r_2)$×(L−2), where $k_2$ ranges from 0.66 to 1.37, L ranges from 2 to 9, and B ranges from 0 to 3.4649; the refractive index difference between the first core layer refractive index $n_1$ and the third cladding layer refractive index $n_5$ is from −0.00029 to −0.01603; the refractive index difference between the second core layer refractive index $n_2$ and the third cladding layer refractive index $n_5$ is from 0.017485 to 0.037885; the refractive index difference between the first cladding layer refractive index $n_3$ and the third cladding layer refractive index $n_5$ is from −0.005 to −0.0153; the refractive index difference between the second cladding layer refractive index $n_4$ and the third cladding layer refractive index $n_5$ is from −0.005 to −0.0153; the refractive index curve of the second core layer refractive index $n_2$ gradually changes and satisfies the refractive index profile distribution function:

$$n(r) = n_2\left[1 - 2\Delta\left(\frac{r-r_1}{\frac{d}{2}}\right)^g\right]^{\frac{1}{2}}, \text{ where } r_1 \le r \le r_2,$$

$$r_a = (r_1 + r_2)/2, d = r_2 - r_1, \Delta = \frac{n_2^2 - n_5^2}{2n_2^2},$$

g is the refractive index profile distribution parameter, and g ranges from −2 to 9.

2. The bending-resistant low-crosstalk photonic orbital angular momentum fiber waveguides as claimed in claim 1, wherein the value of g is −2, −3, 2, 3, or 5.

3. The bending-resistant low-crosstalk photonic orbital angular momentum fiber waveguides as claimed in claim 1, the fiber can control the output of four different-order OAM modes within the wavelength range of 1530 nm to 1565 nm for stable transmission, including OAM-0 order, OAM-±1 order, OAM-±2 order, and OAM-±3 order, and the effective refractive index difference between each OAM mode is greater than 1.52×10⁻⁴.

4. The bending-resistant low-crosstalk photonic orbital angular momentum fiber waveguides as claimed in claim 3, wherein the bending loss of each OAM mode of the fiber at a wavelength of 1550 nm is small, and the macro-bending loss of bending 1 circle at R5 mm is less than or equal to 0.50 dB; the crosstalk between the OAM-0 order and OAM-±1 order modes of the fiber is less than −9 dB/80 km, the crosstalk between the OAM-±1 order and OAM-±2 order modes is less than −16 dB/80 km, the crosstalk between the OAM-±1 order and OAM-±2 order modes is less than −15 dB/80 km, and the crosstalk between the OAM-±1 order and OAM-±3 order modes is less than −25 dB/80 km.

5. The bending-resistant low-crosstalk photonic orbital angular momentum fiber waveguides as claimed in claim 3, wherein the value of g is −2, −3, 2, 3, or 5.

* * * * *